Dec. 5, 1967  L. A. CARLTON ET AL  3,357,025
SUBSURFACE FLOWMETER
Filed Jan. 21, 1966  3 Sheets-Sheet 1
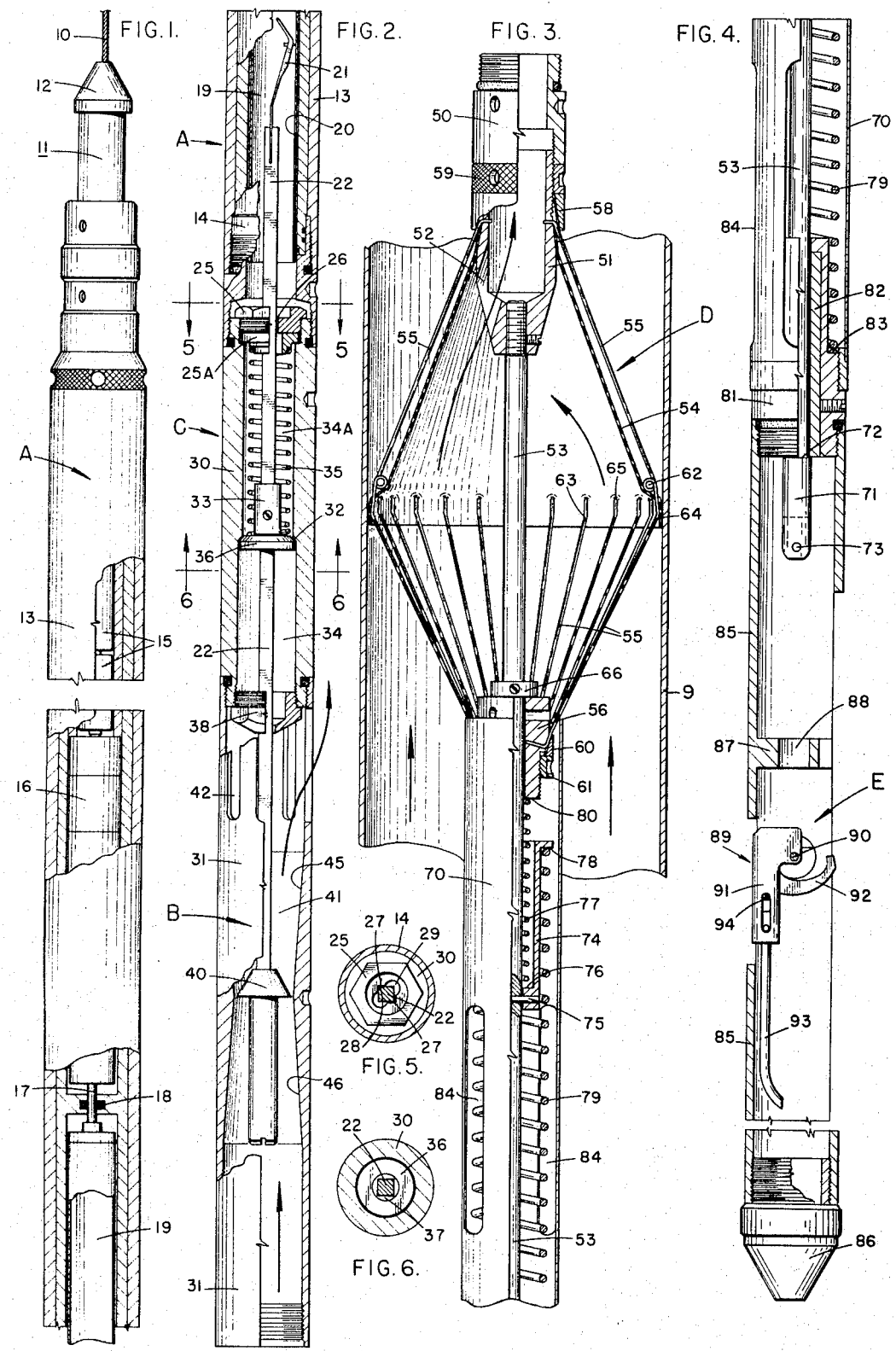

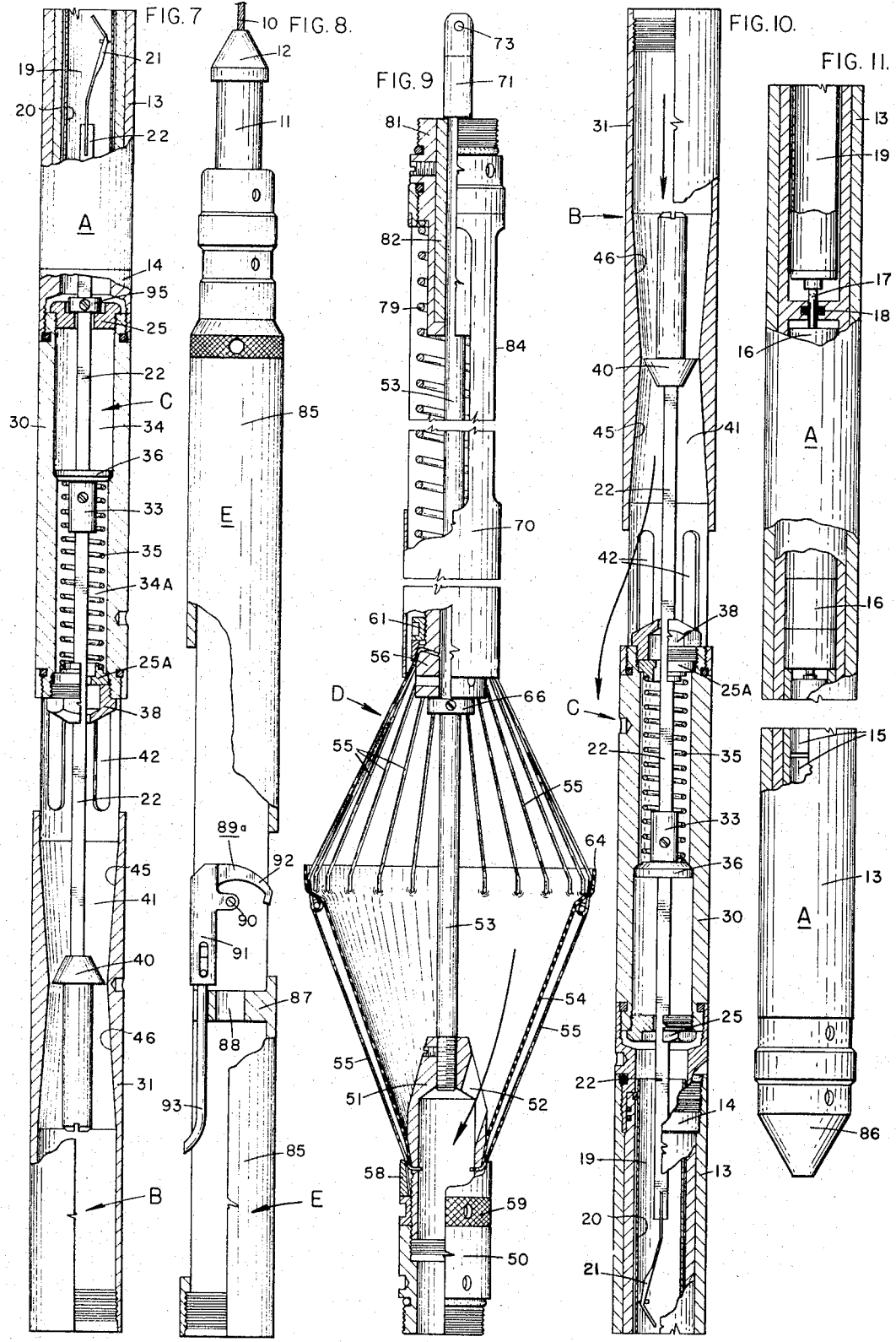

Dec. 5, 1967   L. A. CARLTON ET AL   3,357,025
SUBSURFACE FLOWMETER
Filed Jan. 21, 1966   3 Sheets-Sheet 3
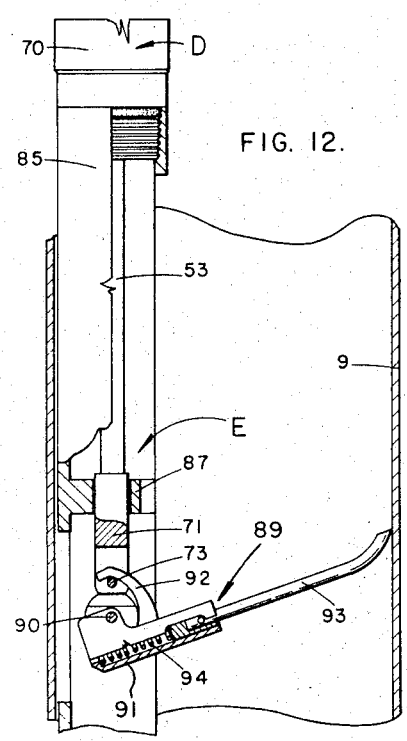
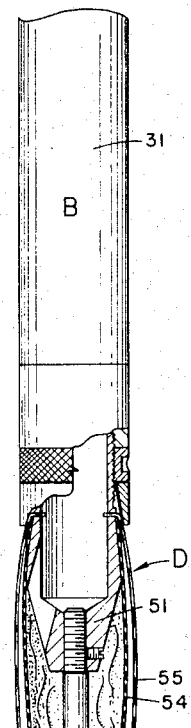
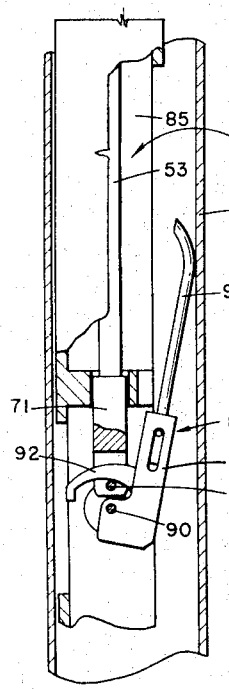
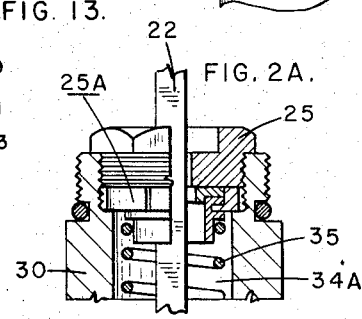
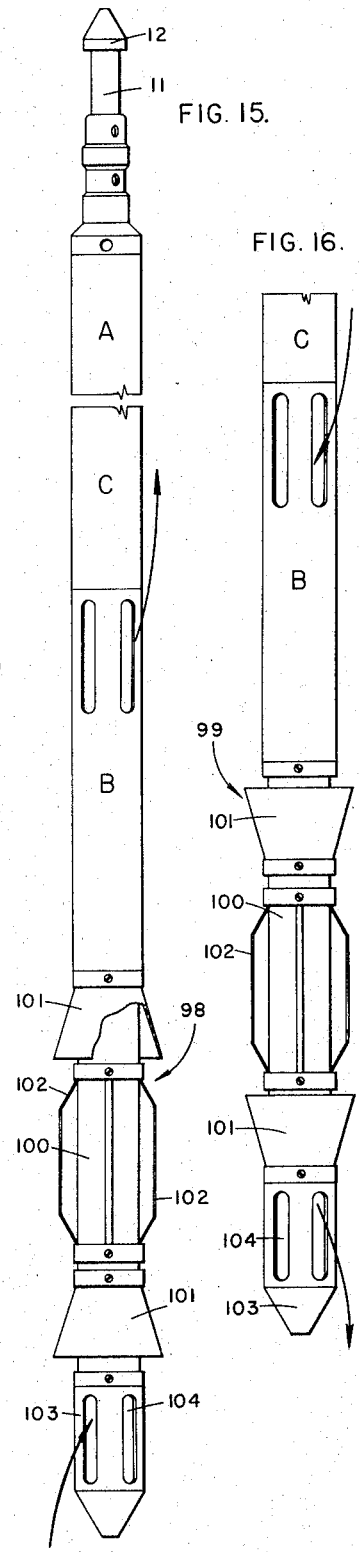

3,357,025
SUBSURFACE FLOWMETER
Louis A. Carlton, Elvis Rich, and Beldon A. Peters, Houston, Tex., assignors to Esso Production Research Company, a corporation of Delaware
Filed Jan. 21, 1966, Ser. No. 522,156
15 Claims. (Cl. 346—33)

The present invention generally concerns an improved self-contained subsurface flowmeter for measuring and recording down-the-hole rates and directions of fluids flowing in wells. In particular, it concerns improvements in the flowmeter apparatus disclosed and claimed in U.S. Patent No. 3,176,304, entitled, Subsurface Flowmeter," issued to Peters et al., Mar. 30, 1965. These improvements concern the capability of the flowmeter of the present invention to measure and record an increased range of flow rates in well pipes. Additionally, an improved guide means for the rotometer shaft functions to prevent rotation of the shaft and minmize drag on it. Another feature of the flowmeter of the present invention resides in the ease with which it is convertible from a flowmeter for measuring fluid flowing upwardly or downwardly in smaller diameter pipe ("tubing") or in larger diameter pipe below smaller diameter pipe ("casing") and vice versa by the simple rearrangement and substitution of removable and replaceable sections of the flowmeter.

When measuring fluid flow in well pipe, it is necessary to divert all of the fluid flowing therein through the flowmeter. Flow diverters are provided on the flowmeter for this purpose. When operating in the same diameter pipe through which the flowmeter is lowered, cup-type flow diverters are preferably employed. However, when operating in well pipe larger in diameter than the well pipe through which the flowmeter is lowered, the flow diverted must be collapsible to permit it to be lowered into the well through the smaller pipe and expansible to divert fluid fllowing in the larger pipe in which it is to be operated. Such a collapsible-expansible flow diverter assembly is disclosed herein; however, the specific features and characteristics thereof are claimed in U.S. application Ser. No. 522,720, entitled, "Subsurface Fluid Flow Diverter," filed Jan. 24, 1966 by Buck et al.

Briefly, the flowmeter apparatus of the invention adapted to record the rate and direction of fluid flow in a well comprises a housing, vertically extending when suspended in a well and capable of being turned upisde down and having spaced-apart ports for permitting well fluids to flow therethrough and including a rotometer section, a fluid flow recording section and an intermediate section capable of being turned upside down arranged between said rotometer section and said fluid flow recording section; the interior wall of said rotometer section being tapered inwardly from each end thereof to define two variable cross-sectional area portions, the smallest cross-sectional area being located between said two portions; a float arranged in said rotometer section longitudinally movable in response to the flow of well fluids through said housing; a shaft connected to said float and movable therewith; recording means arranged in said flow recording section; a stylus mounted on said shaft and movable therewith adapted to record longitudinal movement of said shaft on said recording means; said intermediate section comprising a cylinder having a shoulder formed on the inner wall thereof defining thereby a smaller diameter portion and a larger diameter portion thereof, a movable plate member arranged in the larger diameter portion, biasing means adapted to urge said plate member into engagement with said shoulder, and stop means affixed to said shaft on one side of said plate member adapted to limit movement of said shaft in one longitudinal direction. Flow diverter means are arranged on the flowmeter to cause fluid to flow through the flowmeter.

The apparatus may be arranged for varying rates of fluid flowing in opposite directions in tubing or casing as follows:

(1) For measuring and recording the rates of fluid flowing upwardly or downwardly in tubing, or upwardly in casing, the recording means is positioned above the rotometer section and the biasing means of the intermediate section urges the plate member upwardly; the stop means limits upward movement of the shaft; and downward movement of the shaft from the no-flow position thereof is restrained by the biasing means which biases the plate member upwardly against the stop means; and the flow diverter means is positioned below the rotometer section.

(2) When measuring and recording downwardly flowing fluids in casing, the apparatus of (1) above is reversed or turned upside down, except for the intermediate section which remains in the same position as described in (1) above. A collapsible-expansible flow diverter is positioned above the rotometer section in this arrangement.

(3) When measuring and recording high rates of fluid flowing only upwardly in tubing or casing, the flowmeter is arranged as described in (1) above, except the intermediate section is reversed or turned upside down so that the biasing means biases the plate member downwardly and upward movement of the shaft is restrained by the biasing means which biases the plate member downwardly against the stop means; additional stop means is provided on the shaft to prevent downward movement of the shaft from its no-flow position.

Therefore, a primary object of the invention is to provide an improved flowmeter capable of recording down-the-hole the rates of fluid flowing either upwardly or downwardly in well pipe.

The above object and other objects and advantages of the invention will be apparent from a more detailed description thereof when taken with the drawings wherein:

FIGS. 1 and 2 are vertical, partly sectional views of the flowmeter apparatus of the invention illustrating one arrangement of the sections of the flowmeter for measuring and recording fluid flowing in well pipe;

FIG. 2A is an enlarged detailed view of a portion of FIG. 2;

FIGS. 3 and 4 are vertical, partly sectional views of a collapsible-expansible fluid flow diverter in expanded position for diverting fluid flowing upwardly in casing;

FIG. 5 is a view taken on lines 5—5 of FIG. 2;

FIG. 6 is a view taken on lines 6—6 of FIG. 2;

FIG. 7 is a vertical, partly sectional view of the portion of the flowmeter apparatus shown in FIG. 2 illustrating arrangement of the sections of the flowmeter for measuring and recording high rates of fluid flowing only upwardly in well pipe;

FIGS. 8 and 9 are vertical, partly sectional views of the collapsible-expansible fluid flow diverter of FIGS. 3 and 4 in expanded position arranged for diverting fluid flowing downwardly in casing;

FIGS. 10 and 11 are vertical, partly sectional views of the flowmeter apparatus of the invention illustrating another arrangement of the sections of the flowmeter for measuring and recording fluid flowing in well pipe;

FIG. 12 is a vertical, partly sectional view of the releasable latch mechanism of the flow diverter of FIG. 4 arranged in its latched position as it is lowered through casing;

FIG. 13 is a view similar to that of FIG. 12, but illustrating the position of the releasable latch mechanism as it is lowered through tubing;

FIG. 14 is a vertical, partly sectional view of the flow diverter of FIG. 3 in collapsed running-in position;

FIG. 15 is a vertical, partly sectional view of the flowmeter apparatus of FIGS. 1 and 2 provided with cup-type flow diverters for diverting upwardly flowing fluids in tubing; and FIG. 16 is a vertical, partly sectional view of the flowmeter apparatus of FIGS. 1 and 2 provided with cup-type flow diverters for diverting downwardly flowing fluid in tubing.

For a more complete description of the invention, reference to the drawings in greater detail will now be made.

One arrangement of the flowmeter for measuring and recording the rate and direction of well fluids flowing in well pipe is illustrated from top to bottom in FIGS. 1 and 2. The flowmeter is suspended from the earth's surface in the well on a nonconductor wireline 10 attached to a head member 11 provided with a fishing spear 12. A flow recording section A, a rotometer section B and an intermediate section C positioned between sections A and B are attached to head 11.

Flow recording section A includes an elongated, cylindrical case 13 threadedly connected to head 11 at its upper end and to a cylindrical sleeve member 14 at its lower end. Enclosed within case 13 are a plurality of batteries 15 connected to an electric chart drive motor 16; a chart drum drive shaft 17 provided with a seal 18; a chart drum 19; a chart 20 arranged on the inner surface of chart drum 19; a stylus 21; and the upper end of a square-shaped rotometer shaft 22 attached to stylus 21.

Intermediate section C comprises a hollow, cylindrical member 30 threadedly connected to the lower end of sleeve member 14 at its upper end and at its lower end to the upper end of double-tapered flow barrel or tube 31 of rotometer section B. A guide nut 25 provided with an opening 26 through which square shaft 22 extends is screwed into the upper end of cylindrical member 30. (See also FIG. 5.) Two grooved keyway bushings 27 are formed on opposite sides of opening 26. Diagonally opposed edges 28 of shaft 22 engage keyways 27 and prevent rotation of shaft 22. Spaces 29 are provided by opening 26 to permit debris that might collect above nut 25 to be flushed through it. The area of contact of keyways 27 with shaft 22 is maintained at a minimum to reduce drag on shaft 22.

The interior surface of cylindrical member 30 intermediate its length is provided with a beveled shoulder 32 which forms an opening within member 30 of larger and smaller diameters 34 and 34A, respectively. Shaft 22 extends through this opening in cylindrical member 30. A stop sleeve 33 is affixed to and movable with shaft 22. A tension spring 35 surrounds shaft 22 within cylindrical member 30 and is connected at its upper end to spring retainer members 25A supported in the upper end of member 30 beneath guide nut 25, as shown in detail in FIG. 2A, and at its lower end to a cylindrical plate stop member 36 arranged in the larger diameter portion of cylinder 30. Spring 35 biases plate member 36 upwardly against beveled shoulder 32. Plate member 36 is provided with a circular opening 37 through which shaft 22 extends (see FIG. 6.) A centralizer nut 38 provided with an opening through which shaft 22 extends is threadedly connected to the lower interior surface of cylinder 30.

Shaft 22 is connected to a rotometer float 40 arranged in the flow passageway 41 within flow barrel 31 of section B. Ports 42 are provided in flow barrel 31 at one end of flow passageway 41. As shown in FIG. 2, the upper interior surface 45 of flow barrel 31 tapers downwardly and inwardly and meeets the lower interior surface 46 of barrel 31 which tapers inwardly and upwardly. Thus, the interior surface of flow barrel 31 defines two variable cross-sectional area (upper and lower) portions with the smallest cross-sectional area being located therebetween. Float 40 is positioned at the smallest cross-sectional area under no-flow conditions.

The lower end of flow barrel 31 is adapted to be threadedly connected to a coupling member 50 which in turn is threadedly connected to a fixed mandrel 51 of flow diverter section D, as seen in FIG. 3. Mandrel 51 is provided with ports 52 which permit passage of fluid flowing to and from passageway 41. A rod 53 is connected to mandrel 51 and extends through the interior of flow diverter section D.

The upper ends of a plurality of spring wire ribs 55, spaced circularly and uniformly about rod 53, are connected to fixed mandrel 51 with the lower ends thereof connected to a slidable mandrel 56 which is threaded about its lower exterior. An upper cylindrical wedge member 58, locked in place by means of a nut 59 threaded to the upper end of fixed mandrel 51, secures the upper ends of wire ribs 55. A lower cylindrical wedge member 60, locked in place by means of a nut 61 threaded to slidable mandrel 56, secures the lower ends of wire ribs 55. Each wire rib is formed with a loop 62 intermediate its length. The ribs are preformed to bow radially outwardly such that when assembled on mandrels 51 and 56 without application of force other than that provided by the spring of the wire ribs, they would extend sufficiently to resiliently engage (or extend close to) the wall of a well pipe in which they are to be used at a point intermediate their lengths, such as at 63 in FIG. 3. A skirt 54 of impermeable, nonstretch material, preferably nylon-reinforced rubber fabric, is gripped at its upper end to mandrel 51 by wedge member 58 and extends within the interior of the wire ribs to below loops 62 where it terminates in an edge portion 64 on the exterior of the ribs at 63. The skirt is assembled on wire ribs 55, prior to securing the wire ribs to the mandrel, by passing the lower ends of each wire rib through perforations 65 in the skirt and then sliding the skirt along each wire rib until it is arranged as shown in FIGS. 3, 9 and 14.

A stop ring 66 is secured to rod 53 above slidable mandrel 56. Rod 53 extends through a protective cover sleeve 70 and at its lower end is connected to a clevis rod 71 having a larger diameter than rod 53 to provide a stop shoulder 72. A latch pin 73 extends through clevis rod 71. A cylindrical sleeve 74 is attached to rod 53 by means of pin 75 and forms an inner stop shoulder 76 for the lower end of a compression spring 77 surrounding rod 53 and an upper stop shoulder 78 for the upper end of a compression spring 79 also surrounding rod 53. The underside 80 of slidable mandrel 56 provides a stop for the upper end of spring 77.

The lower end of cover sleeve 70 is threadedly connected to a cylindrical sleeve coupling member 81 within which is arranged a cylindrical bushing 82. A shoulder 83 formed on sleeve 81 supports the lower end of spring 79, Cover sleeve 70 is provided with opening 84 spaced along its length.

Latch section E includes a cylindrical housing 85 threadedly connected to sleeve coupling 81 and terminating in a nose plug 86. A guide collar 87 arranged in housing 85 is provided with an opening 88 through which clevis rod 71 extends. A trigger mechanism generally designated 89 is pivotally mounted on a pin member 90 secured to housing 85 below collar 87. Trigger mechanism 89 includes a base member 91 pivotal on pin member 90, a latch 92 mounted on member 91, a latch release dog 93 and a spring 94 arranged in member 91 (see FIG. 12.

The apparatus illustrated in FIG. 7 is the same as that illustrated in FIG. 2, except intermediate section C has been turned upside down; i.e., reversed with nut 25 remaining on the upper end and nut 38 remaining on the lower end of section C. Nut 25 is retained on the upper end of section C in order to keep the guide elements for shaft 22 near the stylus end thereof.

The apparatus of FIGS. 8 to 11 is substantially the same as that of FIGS. 1 to 4, except the entire tool has been turned upside down and a slightly different trigger mechanism 89a has been substituted for trigger mechanism 89. Head 11 is connected to the end of housing 85 to which the nose plug 86 has been attached (FIG. 4) and nose plug 86 is connected to the end of cylindrical case 13 to which head 11 had been attached (FIG. 1).

In FIG. 15 a flow diverted section 98 for diverting upwardly flowing fluid has been substituted for the flow diverter and latching sections of FIGS. 3 and 4. Similarly, in FIG. 16 a flow diverter section 99 for diverting downwardly directed fluid flow has been substituted for the flow diverter and latching sections of FIGS. 8 and 9. Flow diverter section 98 includes a cylindrical member 100 on which are arranged cup packers 101 and centralizers 102. A nose section 103 is provided with ports 104 for passage of fluid to flow barrel 31. Flow diverter section 99 contains the same components as section 98; however, cup packers 101 are reversed for diverting downwardly flowing fluid.

In operation when it is desired to measure fluid flowing upwardly in casing pipe 9 (see FIG. 3), the arrangement of the apparatus as illustrated in FIGS. 1 to 4 is used. Flow diverter 54 is collapsed and placed within cover sleeve 70, as shown in FIG. 14. Sleeve 70 is held in place over the flow diverter until pin 73 is latched to latch 92, as illustrated in FIGS. 12 and 13. In this position, clevis rod 71 and pin 73 extend through opening 88 in collar 87 and springs 77 and 79 are compressed. The flowmeter then is lowered on wireline 10 through tubing 8 with the trigger mechanism 89 in the position shown in FIG. 13 with dog 93 biased upwardly by spring 94. When latch section E passes out the lower end of tubing 8, trigger mechanism 89 assumes the position shown in FIG. 12 with dog 93 extended outwardly against the wall of casing 9. When the desired elevation in casing 9 at which flow measurements are to be made is reached, the flowmeter is pulled upwardly. This movement causes the pointed end of dog 93 to bite into the interior wall of casing 9 or engage a casing collar thereof which in turn causes member 91 to turn on pin member 90 and release latch 92 from pin 73. Spring 94 is compressed as dog 93 rotates and drops to its position shown in FIG. 4. Spring 79 acting against shoulder 83 of plate member 81 moves cover sleeve 70 and latch section E downwardly until sleeve 82 engages shoulder 72 of clevis rod 71, as illustrated in FIG. 4. At the same time, spring 77 urges slidable mandrel 56 upwardly against stop ring 66 and flow diverter 54 is positioned pressed against the wall of casing 9 to effect a seal, as shown in FIG. 3. Thus, the flow diverter is spring-loaded to force the skirt against the well pipe wall with a larger force than is possible from the spring expansion of the wire ribs. Wire loops 62 prevent the skirt from sliding up the wire ribs to thereby prevent the upwardly flowing fluid from bypassing or "blowing-by" the flow diverter. Wire ribs 55 reinforce skirt 54 and prevent "ballooning" thereof. Thus, the skirt is reinforced and held in proper shape by the looped wire ribs.

Fluid flowing upwardly in casing 9, as illustrated in FIG. 3, is diverted by impermeable skirt 54 through ports 52 and into fixed mandrel 51 and flow barrel 31. The flow of fluid through flow barrel 31 causes rotometer float 40 to move upwardly, which in turn causes shaft 22 to move upwardly through nut 38, plate stop 36 and nut 25. In turn, chart stylus 21 is moved upwardly and records the rates of upward fluid flow on chart 20 of chart drum 19, which is rotated by chart drive motor 16, powered by batteries 15. Rotation of the recorder chart 20 creates a frictional drag on chart stylus 21, which tends to rotate the rotometer shaft 22. The square-shaped rotometer shaft 22 is prevented from rotating by engagement of the edges 28 of shaft 22 with the grooves 27 in guide nut 25.

When it is desired to measure higher rates of fluid flowing upwardly in the well, the tool shown in FIGS. 1 to 4 is rearranged by turning section C of FIG. 2 upside down, replacing nuts 25 and 38 and affixing a stop ring 95 to rotometer shaft 22, as illustrated in FIG. 7. Stop ring 95 rests on nut 25 in the no-flow position of float 40 and prevents shaft 40 and float 40 from moving downwardly from this position. Fluid flowing upwardly through flow barrel 31 moves rotometer float 40 upwardly which causes shaft 22 to move upwardly. The fluid passes through ports 42 into casing 9. Sleeve 33 presses against stop plate 36 which is moved upwardly against the bias of spring 35. Thus, the flow measuring range of the flowmeter in the upward direction is increased.

To measure downward flow in casing 9, the apparatus shown in FIGS. 1 to 4 is rearranged, as illustrated in FIGS. 8 to 11. Clevis pin 73 is initially latched to trigger 92 of unit 89a. In this position, cover sleeve 70 protects flow diverter 54 and ribs 55 while the flowmeter is lowered through tubing 8. The trigger mechanism when latched to clevis rod 71 in this arrangement of the apparatus maintains sleeve 70 in a down position instead of in the up position illustrated in FIGS. 12 and 14. Once released the trigger mechanism 89a assumes the position shown in FIG. 8. Fluid flowing downwardly in casing 9, such as fluid injected through tubing 8, flows through flow diverter 54, as illustrated by the arrows in FIG. 9, into flow barrel 31 and out ports 42. Rotometer float 40 is moved downwardly by the flow of fluids past it, which in turn moves rotometer shaft 22 downwardly to cause stylus 21 to move downwardly in response to fluid flow as chart drum 19 is rotated by the drive motor 16 driven by batteries 15. Spring 35 restrains downward movement of the rotometer shaft 22. Sleeve 33 presses against plate member 36 which is moved downwardly against the bias of spring 35. The arrangement of the apparatus in FIGS. 8 to 11 permits upward movement of shaft 22 until stop sleeve 33 engages the underside of bushing 25A.

When it is desired to measure upward flow in tubing, the flow diverter and latching sections of FIGS. 3 and 4 are disconnected from the rotometer section B of FIG. 2 and flow diverter section 98 is connected to rotometer section B of FIG. 2, as illustrated in FIG. 15. Downwardly facing flexible cup packers made of impermeable rubber or other suitable impermeable material engage the wall of tubing 8 and divert fluid flow through ports 104, through cylindrical member 100 and into rotometer section B. Resilient centralizer members 102 maintain the cup packers in proper position.

To meausre downwardly directed fluid flow in tubing, flow diverter section 99, which differs from flow diverter section 98 only in the direction in which cup packers 101 are faced, is substituted for flow diverter section 98. Fluid flowing downwardly in tubing 8 is diverted by packers 101 through ports 42 in section B of FIG. 2 and out ports 104.

Other arrangements of the apparatus within the scope of the invention will be apparent. For example, two-directional flow could be measured by reversing the direction of the upper cup packer 101 in FIG. 15.

Having fully described the objects, advantages, apparatus and operation of our invention, we claim:

1. Flowmeter apparatus suspendible in a well on a nonconductor wireline for recording the rate and direction of fluid flowing in a well bore comprising:
   an elongated housing vertically extending when arranged in said well and adapted to be turned upside down and having spaced-apart ports for permitting well fluids to flow through said housing and including a rotometer section, a fluid flow recording section, and an intermediate section therebetween adapted to be separately turned upside down;
   the interior wall of said rotometer section being double-tapered inwardly to define two variable cross-sectional area portions thereof, the smallest cross-sectional area being located between said two portions;
   a float arranged in said rotometer section longitudinally movable in response to the flow of well fluids through said housing;
   a shaft connected to said float and movable therewith;
   recording means arranged in said flow recording section;
   a stylus mounted on said shaft and movable therewith adapted to record longitudinal movement of said shaft on said recording means; and
   said intermediate section comprising a cylinder having a shoulder formed on the inner wall thereof defining thereby a smaller diameter portion and a larger diameter portion thereof, a movable plate member arranged in the larger diameter portion of said intermediate section, biasing means surrounding said shaft and connected to said plate member adapted to bias plate member into engagement with said shoulder and stop means affixed to said shaft on one side of said plate member adapted to limit movement of said shaft in one longitudinal direction.

2. Apparatus as recited in claim 1 in which said fluid flow recording section is positioned above said rotometer section and said biasing means within said intermediate section biases said plate member upwardly and said stop means limits upward movement of said shaft, downward movement of said shaft being restrained by said biasing means biasing said plate member upwardly against said stop means.

3. Apparatus as recited in claim 2 adapted to measure and record fluid flowing upwardly in well pipe including a fluid flow diverter connected to the lower end of said rotometer section adapted to divert fluid through said rotometer section.

4. Apparatus as recited in claim 1 in which said fluid flow recording section is positioned above said rotometer section and said biasing means in said intermediate section biases said plate member downwardly, upward movement of said shaft being restrained by said biasing means biasing said plate member downwardly against said stop means.

5. Apparatus as recited in claim 4 adapted to measure and record fluid flowing upwardly in well pipe including a fluid flow diverter connected to the lower end of said rotometer section adapted to divert fluid flow through said rotometer section.

6. Apparatus as recited in claim 1 in which said fluid flow recording section is arranged below said rotometer section and said biasing means in said intermediate section biases said plate member upwardly and said stop means limits upward movement of said shaft, downward movement of said shaft being restrained by said biasing means biasing said plate member upwardly against said stop means.

7. Apparatus as recited in claim 6 adapted to measure and record fluid flowing downwardly in casing pipe including a fluid flow diverter connected to the lower end of said rotometer section adapted to divert fluid flow through said rotometer section.

8. Flowmeter apparatus suspendible in a well on a nonconductor wireline for recording the rate and direction of fluid flowing in a well bore comprising:
   an elongated housing vertically extending when arranged in said well adapted to be turned upside down and having upper and lower ports for permitting well fluids to flow through said housing including a rotometer section, a flow recording section, and an intermediate section therebetween adapted to be separately turned upside down;
   the interior wall of said rotometer section being double-tapered inwardly to define two variable cross-sectional area portions thereof, the smallest cross-sectional area being located between said two portions;
   a float arranged in said rotometer section longitudinally movable in response to the flow of well fluids through said housing, a shaft connected to said float and movable therewith;
   a rotatable chart drum arranged in said flow recording section;
   a recording chart mounted on said drum;
   a stylus mounted on said shaft and movable therewith adapted to record longitudinal movement of said shaft on said recording chart;
   means arranged in said housing adapted to guide said shaft and prevent rotation thereof;
   said intermediate section comprising a cylinder having a shoulder formed on the inner wall thereof defining thereby a smaller diameter portion and a larger diameter portion thereof, a movable plate member arranged in the larger diameter portion of said intermediate section, biasing means surrounding said shaft and connected to said plate member adapted to bias said plate member into engagement with said shoulder and stop means affixed to said shaft on one side of said plate member adapted to limit movement of said shaft in one longitudinal direction; and
   flow diverter means adapted to divert fluid flow through said flowmeter.

9. Apparatus as recited in claim 8 in which said guide means includes a square-shaped shaft and a nut mounted in said intermediate section through which said shaft extends having an opening therethrough provided with two spaced-apart grooves adapted to be engaged by opposed edges of said square shaft.

10. Apparatus as recited in claim 9 in which said fluid flow recording section is positioned above said rotometer section and said biasing means within said intermediate section biases said plate member upwardly and said stop means limits upward movement of said shaft, downward movement of said shaft being restrained by biasing means biasing said plate member upwardly against said stop means.

11. Apparatus as recited in claim 10 adapted to measure and record fluid flowing upwardly in well pipe including a fluid flow diverter connected to the lower end of said rotometer section adapted to divert fluid flow through said rotometer section.

12. Apparatus as recited in claim 9 in which said rotatable chart drum is positioned above said fluid flow recording section and said biasing means in said intermediate section biases said plate member downwardly, upward movement of said shaft being restrained by said biasing means biasing said plate member downwardly against said stop means, and additional stop means arranged on said shaft adapted to prevent downward movement of said shaft below its position under no-flow conditions.

13. Apparatus as recited in claim 12 adapted to measure and record fluid flowing upwardly in well pipe including a fluid flow diverter connected to the lower end of said rotometer section adapted to divert fluid flow through said rotometer section.

14. Apparatus as recited in claim 9 in which said fluid flow recording section is arranged below said rotometer section and said biasing means in said intermediate section biases said plate member upwardly and said stop means limits upward movement of said shaft, downward movement of said shaft being restrained by said biasing means biasing said plate member upwardly against said stop means.

15. Apparatus as recited in claim 14 adapted to measure and record fluid flowing upwardly in well pipe including a fluid flow diverter connected to the lower end of said rotometer section adapted to divert fluid flow through said rotometer section.

References Cited

UNITED STATES PATENTS

| | | | |
|---|---|---|---|
| 2,783,646 | 3/1957 | Rumble | 73—155 |
| 3,176,304 | 3/1965 | Peters et al. | 346—33 |

RICHARD B. WILKINSON, *Primary Examiner.*

JOSEPH W. HARTARY, *Assistant Examiner.*